No. 710,548. Patented Oct. 7, 1902.
J. H. WILSON.
COVER FOR COOKING VESSELS.
(Application filed July 31, 1901.)
(No Model.)
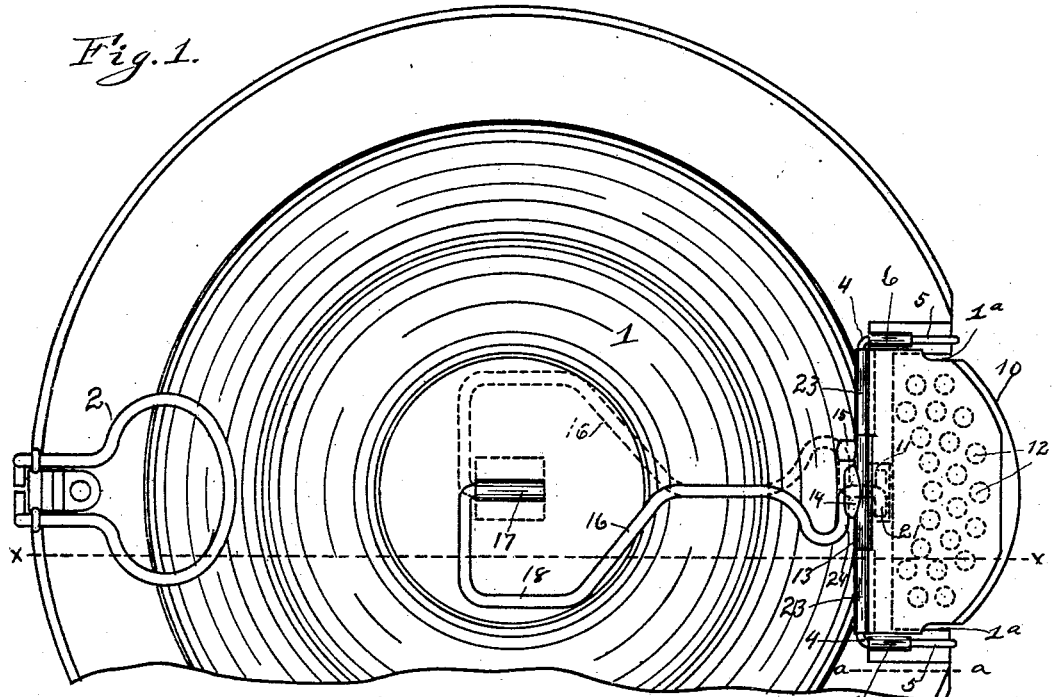
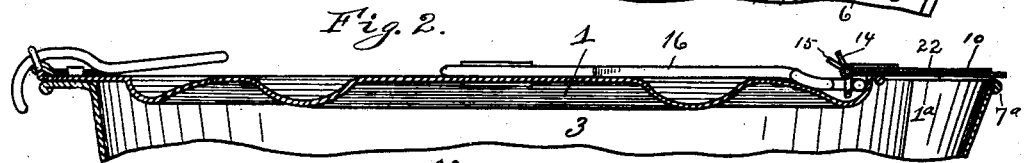
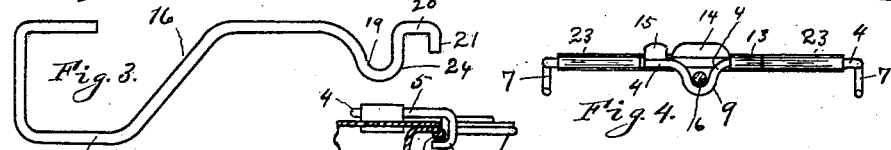
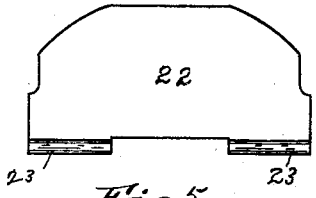
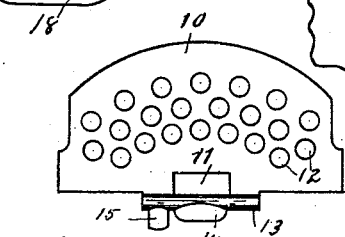
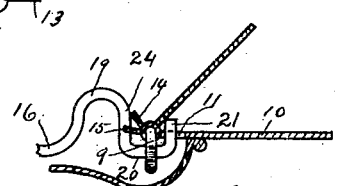
WITNESSES
Matthew Subler
C. M. Theobald
INVENTOR
John H. Wilson,
By R. J. McCarty,
his ATTORNEY

UNITED STATES PATENT OFFICE.

JOHN H. WILSON, OF BLUE ISLAND, ILLINOIS.

COVER FOR COOKING VESSELS.

SPECIFICATION forming part of Letters Patent No. 710,548, dated October 7, 1902.

Application filed July 31, 1901. Serial No. 70,360. (No model.)

*To all whom it may concern:*

Be it known that I, JOHN H. WILSON, a citizen of the United States, residing at Blue Island, in the county of Cook and State of Illinois, have invented certain new and useful Improvements in Covers for Cooking Vessels; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in covers or lids for cooking vessels—such, for example, as kettles, saucepans, &c.

The said invention comprises certain improvements in the cover or lid for cooking vessels which was patented by myself on May 21, 1901, No. 674,569, and the said improvements will be hereinafter described in connection with the accompanying drawings, of which—

Figure 1 is a top plan view of a cover for cooking vessels, the same being made in accordance with my invention. Fig. 2 is a sectional elevation on the line $x\ x$ of Fig. 1, the lower portion of the vessel being broken away. Fig. 3 is a detached view of the tilting handle. Fig. 4 is a detached elevation of the strainer and closure flaps. Fig. 5 is a detached plan view of the closure flap or plate. Fig. 6 is a similar view of the strainer flap or plate. Fig. 7 is detail sectional elevation on line $a\ a$, Fig. 1, showing the manner of securing the flaps to the rim of the vessel. Fig. 8 is a detail sectional view showing the connections between the tilting handle and the flaps.

In my former patent, hereinbefore referred to, I have set forth in detail the advantages of a cover for cooking vessels, which has a strainer closing the discharge spout or opening of the vessel and a closure for said strainer, said strainer and closure being adapted to be thrown open simultaneously through the manipulation of the hand, although the closure may be lifted and the strainer locked in a closed position.

The present invention comprises improved means for raising the closure plate or flap independently of the strainer and at the same time lock the strainer in a closed position and also for raising the closure and strainer plates or flaps at the same time.

The improvements will now be described.

The cover or lid 1 and the clamping-handle 2 are the same or practically the same as shown in my patent above referred to, also the lid engages with rim of the vessel 3 in the same manner, the said vessel being a kettle, sauce-pan, or any cooking vessel adapted to receive a lid or cover.

Referring now to the parts in and around which the invention is centered, 4 designates a yoke which is made of a suitable piece of metal, preferably wire, which is bent to provide two parallel bars or extensions 5 5, by means of which a connection is effected with the lid, the said parts 5 5 being inclosed in keepers 6 6, which are soldered or otherwise secured to said lid. The extreme ends of the bars or extensions 5 5 are bent to provide hooks 7 7, which project under the bead $7^a$, which surrounds the rim of the vessel. (See Fig. 7.) The middle portion of the yoke 4 is bent to provide an eye or loop 9, which will again be referred to.

10 designates the movable strainer plate or flap, which has a hinged connection with said yoke. This strainer-plate is provided with an opening 11 in its rear edge and also a suitable number of strainer-holes 12. The rear edge of the said strainer-plate has a pivot-lug 13, which may be formed by rolling the edge of the plate into tubular form, or said lug may be a separate piece soldered onto the said plate. Through this lug 13 the yoke 4 is passed, and thereby said strainer-plate has a hinged connection, as before specified.

14 and 15 are two ears projecting from the lug 13 on different angles, as shown in Figs. 2 and 8. The lug 14 is instrumental in holding the strainer-plate down over the opening $1^a$ in the vessel, while the function of the lug or ear 15 is to enable the lifting of the said strainer-plate by means of the tilting handle 16, presently more fully described.

22 designates the closure plate or flap, which is also secured by a hinge connection to the yoke 4. This connection is made by means of pivot-lugs 23 23 on the edge of the closure-plate, which inclose the said yoke on each side of the pivot-lug 13 of the strainer-plate.

When the plates 10 and 22 are assembled as in Fig. 4, the tubular lug 13 occupies a position between the tubular lugs 23. It will be seen that both flaps or plates have independent connections with the yoke 4. The tilting handle 16 is loosely secured to the lid by means of a keeper 17. The said handle is manipulated by a hand-grip 18. 19 and 20 are loop portions formed in said handle, the latter portion terminating in a hook 21, which projects through the eye of loop 9 in the yoke and thence into the opening 11 in the strainer-plate. When the said tilting handle 16 is in the position shown in full lines, Fig. 1, both the strainer and closure plates are closed. In this position the hook 21 of said tilting handle is not projected into the opening 11, but lies below said opening. When said tilting handle is made to assume an upright position from the flat position shown in Fig. 1, the hook 21 moves up into the opening 11 and against the adjacent under surface of the closure-plate 22, as shown in Fig. 8, and raises the same off the strainer-plate. In this position of the tilting handle the rounded surface 24 thereof engages with the ear 14, projecting from the strainer-plate, and holds said strainer-plate closed. A further movement of the tilting handle to the position shown in dotted lines, Fig. 1, elevates the strainer-plate by the said rounded portion 24 of the tilting handle coming in contact with the ear 15. The closure-flap is then held up by the strainer-plate. It is easily seen that the strainer-plate may be an integral part of the cover, with the perforations therein arranged near the edge. In this event the closure-plate alone would be movable by the tilting handle, and the ears 14 and 15 by which the strainer-plate is manipulated would of course be dispensed with.

Having described my invention, I claim—

1. A vessel-cover, a strainer-plate hinged to said cover, said strainer-plate having an opening therein adjacent to its hinge connection with the cover, a closure-plate hinged to said cover, and a tilting handle having an end projected below the strainer and closure plates, and means coöperating with said tilting handle for effecting elevations of the closure-plate and the strainer-plate at different times.

2. A vessel-cover, the same being provided with an opening, a strainer-plate hinged to said cover above the opening therein, ears projecting from said strainer-plate, a closure-plate hinged to said cover above the strainer-plate, and a tilting handle mounted on said cover with its end projected under the strainer and closure plates, the said handle adapted in its initial movement to raise the closure-plate and in its subsequent movement to raise the strainer-plate and to maintain both plates in a raised position.

In testimony whereof I affix my signature in presence of two witnesses.

JOHN H. WILSON.

Witnesses:
GEORGE W. LYNCH,
P. B. LUSSON.